US011491509B2

(12) United States Patent
Mayer et al.

(10) Patent No.: US 11,491,509 B2
(45) Date of Patent: *Nov. 8, 2022

(54) COATING MATERIAL COMBINATION CONSISTING OF SURFACER AND TOPCOAT

(71) Applicant: BASF Coatings GmbH, Muenster (DE)

(72) Inventors: Bernd Mayer, Muenster (DE);
Andreas Hanning, Duelmen (DE);
Joerg Hoehne, Muenster (DE);
Katharina Hoelker, Billerbeck (DE);
Sabine Klaas, Duelmen (DE);
Reinhard Wiesing, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 259 days.

This patent is subject to a terminal disclaimer.

(21) Appl. No.: 15/742,081

(22) PCT Filed: Jul. 15, 2016

(86) PCT No.: PCT/EP2016/066984
§ 371 (c)(1),
(2) Date: Jan. 5, 2018

(87) PCT Pub. No.: WO2017/013042
PCT Pub. Date: Jan. 26, 2017

(65) Prior Publication Data
US 2018/0200756 A1 Jul. 19, 2018

(30) Foreign Application Priority Data
Jul. 21, 2015 (EP) .................................... 15177766

(51) Int. Cl.
*B05D 7/00* (2006.01)
*C09D 167/00* (2006.01)
*C09D 17/00* (2006.01)
*C09D 133/00* (2006.01)
*C09D 7/65* (2018.01)
*C09D 7/61* (2018.01)
*C08G 18/10* (2006.01)
*C08G 18/42* (2006.01)
*C08G 18/62* (2006.01)
*B05D 7/14* (2006.01)

(52) U.S. Cl.
CPC ............. *B05D 7/542* (2013.01); *B05D 7/587* (2013.01); *C08G 18/10* (2013.01); *C08G 18/4283* (2013.01); *C08G 18/6225* (2013.01); *C09D 7/61* (2018.01); *C09D 7/65* (2018.01); *C09D 17/002* (2013.01); *C09D 133/00* (2013.01); *C09D 167/00* (2013.01); *B05D 7/14* (2013.01); *B05D 2401/10* (2013.01); *B05D 2451/00* (2013.01)

(58) Field of Classification Search
CPC .......... B05D 7/542; B05D 7/587; B05D 7/14; B05D 2451/00; B05D 2401/10; C09D 7/65; C09D 7/61; C09D 17/002; C09D 133/00; C09D 167/00; C08G 18/10; C08G 18/4283; C08G 18/6225
See application file for complete search history.

(56) References Cited

U.S. PATENT DOCUMENTS

| 5,330,796 | A | 7/1994 | Kasari et al. | |
|---|---|---|---|---|
| 5,366,768 | A | 11/1994 | Kasari et al. | |
| 6,120,851 | A | 9/2000 | Borgholte et al. | |
| 10,434,544 | B2 | 10/2019 | Mayer et al. | |
| 2003/0072943 | A1* | 4/2003 | Anderson | B05D 7/57 428/411.1 |
| 2009/0226729 | A1* | 9/2009 | Niimoto | C09D 163/00 428/416 |
| 2015/0093512 | A1 | 4/2015 | Brunner et al. | |

FOREIGN PATENT DOCUMENTS

| CN | 104513602 | | 4/2015 |
|---|---|---|---|
| DE | 199 48 005 A1 | | 5/2001 |
| EP | 0512562 A2 | | 11/1992 |
| EP | 0513814 A1 | | 11/1992 |
| JP | 55-82167 A | | 6/1980 |
| JP | 59-183867 A | | 10/1984 |
| JP | 01-210081 | * | 8/1989 |
| JP | 8-294662 A | | 11/1996 |
| JP | 2000-70833 A | | 3/2000 |
| JP | 2002-254025 A | | 9/2002 |
| JP | 2003-164803 A | | 6/2003 |
| JP | 2004-33845 A | | 2/2004 |

(Continued)

OTHER PUBLICATIONS

Machine English translation of JP 01-210081, Niichi et al., Aug. 1989.*
Japanese Office Action dated Jan. 29, 2019 in Japanese Patent Application No. 2018-503244 (with unedited computer generated English translation), 7 pages.
Japanese Office Action dated Jan. 22, 2019 in Japanese Patent Application No. 2018-503239 (with unedited computer generated English translation), 8 pages.

(Continued)

*Primary Examiner* — Patrick D Niland
(74) *Attorney, Agent, or Firm* — Armstrong Teasdale LLP

(57) ABSTRACT

Coating material combination consisting of a coating material for forming a surfacer coat and a coating material for forming a topcoat, and use thereof for producing a coating system consisting of a surfacer coat and topcoat on a substrate. The substrate preferably comprises the body or the cabin of a motor vehicle, or a constituent thereof. The coating material combination of the invention is suitable especially for producing coatings consisting of a cured surfacer coat and a cured topcoat on automobiles and commercial vehicles, such as trucks, vans, or buses.

24 Claims, No Drawings

(56) References Cited

FOREIGN PATENT DOCUMENTS

| JP | 2005-177541 A | 7/2005 |
|---|---|---|
| JP | 2009-507994 A | 2/2009 |
| JP | 2012-116879 | 6/2012 |
| JP | 5324715 B1 | 10/2013 |
| JP | 2014-210225 | 11/2014 |
| KR | 10 2000 0068009 A | 11/2000 |
| WO | WO 2007/033134 A1 | 3/2007 |
| WO | 2014-169996 | 10/2014 |
| WO | 2015/090799 A1 | 6/2015 |
| WO | 2015/090814 A1 | 6/2015 |

OTHER PUBLICATIONS

Russian Search Report dated Dec. 24, 2018 in Russian Patent Application No. 2018106331, 2 pages.
Russian Search Report dated Nov. 27, 2018 in Russian Patent Application No. 2018106328, 2 pages.
A. D. Akovlev "Himia I tehnologia lakokrasocnyh pokrytij", Leningrad, "Himia", 1981, pp. 300-304 (RU), 7 pages.
International Search Report dated Oct. 14, 2016, in PCT/EP2016/066984, filed Jul. 15, 2016.
English translation ofthe Japanese Office Action dated Jun. 20, 2019 in Patent Application No. 2018-503244, 13 pages.

\* cited by examiner

COATING MATERIAL COMBINATION CONSISTING OF SURFACER AND TOPCOAT

The present invention relates to a solvent borne coating material combination consisting of a coating material for forming a surfacer coat and a coating material for forming a topcoat, and use thereof for producing a coating system consisting of a surfacer coat and topcoat on a substrate. The substrate preferably comprises the body or the cabin of a motor vehicle, or a constituent thereof. The coating material combination of the invention is suitable especially for producing coatings consisting of a cured surfacer coat and a cured topcoat on automobiles and commercial vehicles, such as trucks, vans, or buses.

Known from the prior art is the coating of bodies or cabins of motor vehicles customarily in a multistage process, resulting in a multicoat paint system. These known finishing processes customarily have the following steps:

1) phosphating of the substrate;
2) application of a cathodic electrocoat and curing of the electrocoat, resulting in a corrosion control electrocoating;
3) application of a coating material to form a surfacer coat. The application is made customarily in two spray passes. Following application, the resulting surfacer coat is first flashed off (flash-off time) and then cured thermally (at 60 to 150° C., for example) to form a cured surfacer coat. Typical film thicknesses of the cured surfacer coat are between 30 µm and 80 µm. Latter film thicknesses are used if sanding of the cured surfacer coat is intended;
4) a) application of a coating material for forming a single-coat topcoat. The application takes place customarily in at least two spray passes. Coating materials for forming single-coat topcoats are usually of single-color pigmentation. Following application, the resulting topcoat is first flashed off and then cured thermally. Typical film thicknesses of the cured topcoat, depending on hue and hiding power, are between 50 and 80 µm.
b) Alternatively to a), the application of a coating material for forming a basecoat, with subsequent application of a coating material for forming a clearcoat, may also be carried out. The basecoats are flashed off prior to the application of the coating material for forming the clearcoat, and reach film thicknesses of about 10 to 20 µm. In relation to the flash-off times, the general rule is that an extension to the flash-off time results in improved appearance of the clearcoat over it. After a corresponding flash-off time, a coating material for forming a clearcoat is applied. This clearcoat is optionally flashed off and then cured thermally. Typical film thicknesses for the cured clearcoat are approximately 50 µm.
5) Alternatively to the combination of sections 3 and 4a, topcoats are also applied directly, i.e., without cured surfacer coat, to the cured cathodic electrocoat. The absent cured surfacer coat, however, makes it possible for UV rays to be transmitted, for example, which can lead to chalking of the cured electrocoat and to loss of adhesion. An increase in the amount of UV absorbers would result in significantly higher costs of material. Where a variety of substrates or different substrates are employed, it is necessary to apply a significantly higher film thickness to obtain the desired coverability, especially in the case of hues with poor hiding power. Per high-quality applications, this option is ruled out on grounds of quality and/or cost.
6) Alternatively to the combination of section 3 and 4a, "integrated" finishing processes are used, in which the properties of the cured surfacer coat are achieved through application of a first basecoat. In these integrated processes, applied first of all is a coating material for forming the first basecoat, which comprises, for example, no effect pigments, but instead has additional functional fillers. This first basecoat is optionally flashed off before a coating material for forcing a second basecoat is applied. The dry film thickness of the first basecoat is about 20 µm. This is followed by the application of a further coating material for forming a second basecoat. This coat is used for setting the hue. The dry film thickness of this second basecoat is customarily less than 29 µm. Following application of the second coating material for forming the second basecoat, the first and second basecoats are flashed off in a flash-off zone at least to a dust-dry state. This is followed by the application of an unpigmented coating material to form a clearcoat. This coat is optionally flashed off in turn, prior to the concluding thermal curing of this coat.

The coating materials used in the steps described above comprise in principle a plurality of constituents: binders, pigments and fillers, and also solvents, with possible additives included among the binders, depending on the definition of the terra "binder". Binders are in principle responsible for forming a crosslinked film on a substrate. The term "main binder" refers to the binder constituent that is primarily responsible for forming a crosslinked film. Coating materials may in principle be physically curing, self cross-linking, or externally crosslinking. Generally speaking, coating materials are divided into one-component systems (1-K) and two-component systems (2-K). 2-K systems are all those coating materials to which a crosslinker component must be added shortly before processing in order to cure the coating material. The remaining coating materials, to which no crosslinker component will be added shortly before processing in order to cure the coating material, are referred to as 1-K systems. In the case of two-component coating materials, both the component to be crosslinked and the corresponding crosslinker form the main binder.

In relation to the solvent, the possibility that generally exists is for the coating materials to foe substantially solvent-based or substantially aqueous.

A feature common to the above-described coating methods from the prior art for producing a coating of two or more coats is that the application of a coating material to a coat already applied beforehand is always undertaken only when that coat has reached at least a dust-dry state. This ensures that the coating materials of the different coats need not foe compatible with one another in the liquid state, and allows the very different coating materials in the various coats to foe combined with one another. Thus, for example, it is possible to combine aqueous coating materials with solvent-borne coating materials, or epoxide-based binders with polyurethane-based binders. In the literature, incorrectly, coating methods in which a coating material is applied to an existing coat that has not yet been fully cured are referred to as "wet-on-wet" methods.

Furthermore, so-called "wet-on-wet" products are available commercially for producing a surfacer coat and a topcoat. These products too necessarily require the flashing of the surfacer coat at least to a dust-dry state (but not a thermal care) before a topcoat can be applied. Here as well, accordingly, the term "wet-on-wet" is misleading and is not applied correctly.

Depending on the desired profile of properties of the multicoat paint system, coating materials for the individual coats can be selected almost independently of one another. The proven finishing methods described above therefore offer very complex possibilities for variation, allowing even highly specific requirements of a multicoat paint system to be met.

In view of the numerous possibilities for variation of the coating materials, however, they also entail numerous possibilities for error, which can be eliminated only by complicated and therefore expensive correction steps. Examples of possible sources of error are errors in surfacer application, which have to be eliminated by sanding of the cured surfacer coat prior to topcoat application. In addition, during the finishing operation, bodies or constituents thereof are held temporarily in buffer zones, as a corollary of the operation, where they may become soiled. A risk inherent in this system is that, for example, of a coating material for forming a topcoat being applied to a surface which has not been adequately cleaned, and the cured topcoat subsequently exhibiting surface defects. These defects must then be eliminated, in turn, at cost and inconvenience.

It was an object of the present invention, accordingly, to provide a new combination of coating materials which are suitable for producing a coating consisting of a cured stir facer coat and a cured topcoat, have low complexity and are distinguished by a reduction in possibilities for error in the production of the coating. At the same time, the combination of coating materials should make it possible to shorten the process for producing the coating such that operating times and operating costs can be reduced. The profile of properties of the resulting coating is to be at least comparable with coatings produced using coating combinations from the prior art. In particular, the coatings are to be at least comparable—in terms of their visual properties (appearance, gloss, leveling, etc.) and their mechanical properties, such as weathering resistance and chemical resistance, for example—with coatings from the prior art.

It has been possible to achieve this object by the provision of a coating material combination consisting of a coating material comprising at least one coloring pigment and comprising at least one externally crosslinking binder as main binder for forming a surfacer coat on a substrate, and of a coating material comprising at least one coloring pigment and comprising at least one externally crosslinking binder as main binder for forming a topcoat on the surfacer coat, characterized in that the coating material for forming the surfacer coat and the coating material for forming the topcoat are compatible according to DIN EN ISO 12944-5: 2008-1, wherein the coating material for forming the topcoat can be applied to the surfacer coat before the surfacer coat has reached drying stage 1 according to DIN 53150:2002-09, the drying stage being determined according to EN ISO 9117-3:2010, and the coating material for forming the surfacer coat and the topcoat comprise, as solvents, organic solvents.

The present invention further relates to a coating material combination consisting of a coating material comprising at least one externally crosslinking binder as main binder for forming a surfacer coat on a substrate, and coating material comprising at least one externally crosslinking binder as main binder for forming a topcoat on the surfacer coat, characterized in that the coating material for forming the surfacer coat and the coating material for forming the topcoat are compatible according to DIN EN ISO 12944-5: 2008-1, wherein the coating material for forming the topcoat can be applied to the surfacer coat before the surfacer coat has reached drying stage 1 according to DIN 53150:2002-09, the drying stage being determined according to EN ISO 911-3: 2010, and the coating material for forming the surfacer coat and the topcoat comprise, as solvents, organic solvents.

Within the meaning of the present specification, the following definitions of terms are introduced:

The term "coating" describes the entirety of the cured coats which have been or are to be applied to a substrate. The term "coat" refers to a continuous coat formed by single or multiple application of coating material to a substrate. A coat is converted into a cured coat by curing. In the case of a coating which has only one cured coat, the terms coating and cured coat are synonymous.

The term "coating system" refers to the entirety of the coats of coating materials which have been or are to be applied to a substrate.

A coating material is a liquid product which when applied to a substrate produces a coat. After curing, a cured coat is the result of this coat. Where two or more coating materials are applied in succession, to form one coat in each case, the result is a coating system. Where this coating system is cured, the result is a coating consisting of the respective cured coats. In order to simplify the designations, the coating materials for forming the respective coat are also named according to that coat: this means that a coating material for forming the surfacer coat is referred to as surfacer, and a coating material for forming a topcoat is referred to as topcoat.

"Flashing (off)" is the partial evaporation of the volatile fractions of a coating material before film formation is complete and/or a further coating composition is applied. The flashing time is also referred to as flash-off time.

Curing or physical drying is the entire complex of processes, reaction sequences, transformations, and so on, that are associated with the transition of the coating material applied in liquid form into a solid film adhering thoroughly to the substrate. The result of the curing is a cross linked film. This may be achieved by chemical or physical cross linking, i.e., the interlooping of polymer chains by complete removal of the solvent.

The general terra "binder", according to DIN 4618:2007-03, is the nonvolatile fraction of a coating material without pigments and fillers. The term "solids" describes the nonvolatile fraction of a coating material.

It is essential to the invention that the coating material for forming the surfacer coat and the coating material for forming the topcoat are compatible according to DIN EN ISO 12944-5:2008-01.

It is further essential to the invention that the coating material for forming the topcoat can be applied to the surfacer coat before the surfacer coat has reached the drying stage 1 according to DIM 53150:2002-09, the drying stage being determined according to EN ISO 9117-3:2010.

Applying the coating material for forming a surfacer coat to a substrate results in formation of the surfacer coat. The purpose of the surfacer coat is to level out any unevennesses and/or differences in hue of the substrate. At the same time, this coat, when in the cured state, acts to absorb energy and to protect the underlying substrate surface from UV transmission. A feature of the coating material combination of the invention is that the application of the coating material for forming the topcoat to the surfacer coat can take place before the surfacer coat has reached drying stage 1 according to DIM 53150:2002-09, the drying stage being determined according to EN ISO 9117-3:2010. This means that the coating material combination must be suitable for direct, as in wet-on wet, application of the surfacer and of the topcoat.

A consequence of this with corresponding application is the direct "wet-on-wet" application of the two coating materials, and so there is no discrete boundary layer formed between the surfacer coat and the topcoat. Hence there is automatically intercoat adhesion between the cured surfacer coat and the cured topcoat.

As a corollary of operation, unavoidable flash-off times arise between the application of the coating material for forming the surfacer coat and the application of the coating material for forming the topcoat, resulting from the cycle times when applying the coating materials and the result, where practiced, of additional operations, such as preliminary coating at critical locations, such as on beads and edges, for example. These unavoidable flash-off times generally result in an impaired appearance, such that, when using the coating material combination of the invention for producing a coating, the flash-off times between the application of the surfacer and of the topcoat are to be kept as short as possible.

As a result of the coating material combination having to be suitable for the coating material for forming the topcoat to be applied to the surfacer coat before said surfacer coat is dust-dry, it is essential to the invention that the coating materials for forming the surfacer coat and the topcoat are compatible according to DIN EN ISO 12944-5:2008-01. In general this means that no unwanted effects occur when the topcoat is applied to the not yet dust-dry surfacer coat. This means in particular that no negative physical or chemical interactions arise that negatively impact film formation or the properties of the resulting coating. Unwanted effects in the sense of this invention are, in particular, the development of a discrete phase boundary between the surfacer coat and the topcoat, preventing any partial mixing of the surfacer coat and the topcoat. It is undesirable, furthermore, for separation of the respective coating materials to occur, as it can result, for example, in a gradient of the main binder within the coat in question. Other unwanted side effects are the incidence of precipitation in the coating system, as a result, for example, of the formation of solids within the coating system due to (precipitation) reactions of components of the coating material for forming the surfacer coat and components of the coating material for forming the topcoat; instances of transfer of wetting such that, for example, wetting additives of the surfacer coat interact with wetting additives of the topcoat, leading to destabilization of pigments or fillers. In the sense of the present invention, the unwanted effects also include unwanted surface effects of the resulting coating, such as the occurrence of craters, pinholes, or similar defects in the coating, for example.

The coating materials for forming the surfacer coat and the topcoat comprise at least one coloring pigment.

Pigments according to DIN EN ISO 4618 are colorants which consist of fine particles which are insoluble in the liquid phase of the coating material and which are used for their optical, protective and/or decorative qualities. The term "colorant" here includes black or white colorants. Preferred pigments are coloring pigments and/or effect pigments and anticorrosion pigments. Effect pigments are those which impart an optical effect, deriving in particular from reflection of light.

Examples of suitable inorganic coloring pigments are white pigments such as zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Further, inorganic coloring pigments are silicon dioxide, aluminum oxide, aluminum oxide hydrate, more particularly boehmite, titanium dioxide, zirconium oxide, cerium oxide, and mixtures thereof.

Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

It is generally possible to check the compatibility of two coating materials in a manual test. For this purpose, in the case of unpigmented coating materials, they are mixed in a transparent container. In the case of pigmented coating materials, an extract of the coating materials is prepared that contains no pigments. If, on mixing, the two coating materials form a clears homogeneous, and stable solution, the coating materials are compatible with one another. By cooling of the mixtures down to −40° C. and evaluation of the transparency in terms of clarity and translucency, it is possible to evaluate the compatibility of any desired mixtures of coating materials or any desired combinations of binders. As well as the temperature, other variable factors include the selected cooling rate, the cooling time and holding time, and the amounts employed. Accordingly, for comparative tests, the variables can be kept constant or sufficiently similar. In addition to visual evaluation, another technical possibility is that of "turbidity measurement" in analogy to photometric techniques. This allows the results to be quantified more effectively.

Compatibility of the coating materials of the coating material combination is preferably achieved by the main binder of the coating material for forming the surfacer coat being compatible with the main binder of the coating material for forming the topcoat according to DIN EN ISO 12944-5:2008-01. Unwanted side effects in relation to the compatibility of binders are in particular, for the purposes of this invention, in addition to the side effects already recited in terms of the coating materials, that the curing of one main binder does not interfere with the curing of the other binder such that defects occur in the resulting coating, such as surface defects, for example. In order to illustrate this, the following example is given: The main binders of the coating materials for forming a surfacer coat and a topcoat are miscible very well and without limitation. One main binder contains primarily very reactive primary hydroxyl groups, while the other main binder contains only low-reactivity hydroxyl groups. As a result of the application of the coating material for forming the topcoat to the surfacer coat before the latter has achieved dust dryness, there is a partial mixing of the coating materials and hence also a partial mixing of the main binders, causing the two main binders to be part of the other coat. Curing by chemical crosslinking of the hydroxyl groups of the two main binders would take place very differently in terms of time, resulting in a very uneven surface.

Compatibility of the main binders of the coating materials for forming the surfacer coat and the topcoat is preferably achieved by the main binder of the coating material for forming the surfacer coat belonging to the same binder class as the main binder for forming the topcoat.

In the context of this invention, the concept of binder class means that the main binders belong to the same chemical compound class. Examples of chemical compound classes in the sense of this invention are polycondensation resins, such as alkyd resins, saturated and unsaturated polyester resins, polyamides, polyimides, silicone resins, and also crosslinker resins, such as phenolic resins and urea resins. Furthermore, the polyaddition resins, such as polyurethanes or epoxy resins, for example, and addition-polymerization resins, such as polyolefins, polyvinyl compounds or poly(meth)acrylates, for example, constitute a chemical compound class.

The main hinder of the coating materials for forming the surfacer coat and the topcoat are preferably selected from the group consisting of isocyanate-crosslinking, polyhydroxyl group-containing polyester resins and polyacrylate resins and mixtures thereof, isocyanate-crosslinking polyhydroxyl group-containing polyacrylate resins being preferred.

The main binders of the coating material combination of the invention consisting of surfacer and topcoat are externally crosslinking binders, meaning that the surfacer and the topcoat of the coating material combination of the invention each constitute a two-component system, comprising in each case a crosslinker component and a component to be crosslinked.

Preferably, the ratio of the reactive groups of the crosslinker component to the reactive groups of the component to be crosslinked in the main binder is selected such that this ratio between the coating material for forming the surfacer coat and the coating material for forming the topcoat is similar. Similar in this context means that the ratio of the reactive groups to one another differs preferably by not more than 30%, more preferably 20%, very preferably 10%, between the two coating materials of the coating material combination of the invention. With very particular preference, the ratio of the reactive groups of the crosslinker component to the reactive groups of the component to be crosslinked in the binders of the two coating materials of the coating material combination is substantially identical. Substantially identical means that this ratio between the coating material for forming the surfacer coat and the coating material for forming the topcoat differs by not more than 5%.

It is further preferred for the reactive groups of the crosslinker components and also the reactive groups of the components to be cross linked in the binders of the coating materials to be extremely similar chemically, and more preferably chemically identical.

Very preferably, the reactive groups of the crosslinker component are isocyanate groups and the reactive groups of the component to be crosslinked are hydroxyl groups.

The above-described preferred versions show by way of example how compatibility can be achieved between the main binders of the coating materials for forming the surfacer coat and the topcoat.

It is especially preferred for the main binders of the coating materials for forming the surfacer coat and for forming the topcoat to be identical.

The coating material for forming the surfacer coat and the coating material for forming the topcoat comprise, as solvents, organic solvents.

The term "organic solvents" in connection with the coating material combination of the invention is a reference to those coating materials which, as solvents, comprise organic solvents as main component and are therefore substantially free of water. Possibly, however, the coating materials may include water in very small fractions. The fraction of water is preferably not more than 1.0 wt %, more preferably not more than 0.5 wt %, very preferably not more than 0.1 wt %, more particularly not more than 0.01 wt %, based in each case on the total fraction of solvents present in the coating materials. Suitable solvents are all those which under the selected reaction conditions are not reactive or whose reactivity with respect to the reaction partners is negligible, and in which the reactants and the reaction products are at least partly soluble. It may be noted here in particular that organic solvents with hydroxyl groups hinder the isocyanate-crosslinking of a binder, and unwanted secondary reactions occur. It is therefore preferred for the organic solvents to be selected such that they are substantially free from mono- or polyhydric alcohols. Possibly, however, the coating materials may comprise mono- or polyhydric alcohols in very small fractions. The fraction of mono- or polyhydric alcohols is preferably not more than 1.0 wt %, more preferably not more than 0.5 wt %, very preferably not more than 0.1 wt %, more particularly not more than 0.01 wt %, based in each case on the total fraction of the solvents present in the coating materials.

Examples of organic solvents include heterocyclic, aliphatic or aromatic hydrocarbons, ethers, esters, ketones, and amides, such as, for example, N-methylpyrrolidone, N-ethylpyrrolidone, dimethyl-formamide, toluene, xylene, diethylene glycol dimethyl ether, cyclohexanone, methyl ethyl ketone (MEK), methyl isobutyl ketone (MIBK), acetone, isophorone, 2-heptanone (MAK), butyl glycol acetate (BGA), butyl acetate, or mixtures thereof. With particular preference the organic solvents are selected from the group consisting of 2-heptanone (MAK), butyl glycol acetate (BGA), butyl acetate, and mixtures thereof.

The organic solvents of the coating material for forming the surfacer coat and the organic solvents of the coating material for forming the topcoat preferably belong to the same solvent class. The concept of solvent class in the sense of this invention means that the solvents have a similar chemical structure and/or have similarly or identical functional groups. Examples of solvent classes are aromatic hydrocarbons, aliphatic hydrocarbons, esters, ketones or ethers.

It is further preferred for the organic solvents of the coating material for forming the surfacer coat and the organic solvents of the coating material for forming the topcoat to be very largely similar. Similarity in the solvents and/or mixtures thereof means in particular that they have a similar polarity.

More preferably the organic solvents are selected from the group consisting of two-heptanone (MAK), butyl glycol acetate (BGA), butyl acetate, and mixtures thereof.

It is preferred for the organic solvents of the coating material for forming the surfacer coat and the organic solvents of the coating material for forming the topcoat to be identical.

It is especially preferred for the main binder and the organic solvents of the coating material for forming the surfacer coat and the main binder and the organic solvents of the coating material for forming the topcoat to be identical.

The coating material for forming the surfacer coat preferably comprises fillers.

Fillers, according to DIN EN ISO 4618, are materials in granular or powder form which are insoluble in the liquid phase of a coating material and are used in order to achieve or influence defined physical qualities. Since there may be instances of overlap between pigments and fillers in terms of their intended use, the refractive index is often employed to distinguish between them. For fillers, the refractive index is below 1.7, meaning that this class of product does not achieve any notable scattering and hiding power.

The coating materials for forming the surfacer coat and the topcoat preferably each have a solids fraction of at least 40 wt %, more preferably of at least 50 wt %, very preferably of at least 65 wt %. This means that the coating materials used for forming the surfacer coat and the topcoat are preferably at least what are called high-solids (HS) or, more preferably, ultrahigh-solids (UHS) coating materials. Through the preferably high solids content it is possible to ensure application of the desired film thicknesses with one spray pass.

A definition with general validity for the terms MS (medium solids), HS (high solids) or UHS (ultrahigh solids) does not exist. In the case of finishing units without thermal cleaning of outgoing air (incineration), the solvent content in spray-ready mixtures ought to be kept as low as possible for reasons of environmental protection. Within the EU (but in other regions as well), therefore, different limits have been drawn up according to the field of application, for approval of operation of such units. Under this definition, MS coatings have a VOC>420 g/l, HS<420 g/l and UHS<350 g/l. The determination is made, for example, according to DIN EN ISO 11890 or ASTM D2369, and is calculated according to the following formula:

VOC (g/l)=(mass of volatile fractions [g]−mass of water [g]/(volume of coating material [l]−volume of water [l]), an organic compound being classed as volatile if it has a vapor pressure of 0.01 kPa at 293.15 K.

Given that the water fraction is subtracted each time and the reference point is the volume of the water-free coating material, the emissions become comparable for the same application (application efficiency, number of spray passes, etc.) and the same area finished, even with coating materials differing in their pigmentation. A corresponding definition applies to the present invention.

The coating materials of the coating material combination for forming the surfacer coat and the topcoat are preferably rheology-optimized in that they exhibit sufficient run stability and pop stability. This is achieved preferably by the use of rheological agents and optionally defoamers. Examples of rheological agents which can be used preferably in the coating materials of the coating material combination of the invention for controlling the rheological properties of the coating materials are fumed silicas, bentonites, and urea-functionalized polymers.

A further subject of the invention is the use of the coating material combination of the invention for producing a coating system, consisting of a surfacer coat and topcoat, on a substrate, wherein i-a) the coating material for forming the surfacer coat is applied to the substrate to form a surfacer coat, and i-b) the coating material for forming the topcoat is applied to the surfacer coat to form a topcoat, the application of the coating material to form the topcoat in i-b) taking place before the coating material for forming the surfacer coat in i-a) has reached drying stage 1 according to DIN 53150:2002-09, the drying stage being determined according to EN ISO 9117-3:2010.

The coating system consisting of a surfacer coat and topcoat is preferably used for producing a coating consisting of a cured surfacer coat and cured topcoat, by the curing of the coating system.

The application of the coating material for forming the surfacer coat and of the coating material for forming the topcoat takes place preferably by pneumatic and/or electrostatic spraying (ESTA). These operations may be supplemented by manual operations, for the preliminary finishing of critical points, for example.

The coating materials for forming the surfacer coat and the topcoat are preferably each applied at a wet film thickness so as to result in a dry film thickness of 25 to 35 μm for the cured surfacer coat and a dry film thickness of 40 to 80 μm for the cured topcoat.

The dry film thickness of the cured surfacer coat and of the cured topcoat is determined microscopically by means of transverse sections. For this purpose, the cured coats produced are parted from the substrate using suitable tools, such as with a scalpel, for example. The film sections thus obtained are fastened in a slide holder to allow the coating to be microscoped (transverse section, so-called). By appropriately calibrated microscopy in conjunction with image analyses, film thickness determinations can be carried out to an accuracy of plus/minus 1 μm.

The coating material combination of the invention is especially suitable for producing coatings on automobiles and commercial vehicles, such as trucks, vans, or buses. The substrate is therefore preferably a body or a cabin of a motor vehicle or a part thereof. More preferably the substrate is a body or a cabin of an automobile or commercial vehicle, more particularly of trucks, vans, or buses.

The observations above show that the complexity involved in producing a coating can be reduced massively by the coating material combination of the invention and the use thereof in accordance with the invention. Accordingly, for example, in the case of two-component coating materials using an identical crosslinker component in the surfacer and in the topcoat, it is possible, with regard to plant technology, to do without an additional separate conduit for the crosslinker component. Furthermore, the coating materials for forming the surfacer coat and for forming the topcoat can be processed on one unit. As a result, a substantial expansion to capacity is possible through the omission of a separate line for applying the surfacer coat, thereby permitting a significant reduction to be realized in the capital investment costs per unit coated surface area.

The coating material combination of the invention makes it possible to omit operating steps susceptible to errors, so that a reduction in possibilities for error, in operating times, and in operating costs is achieved. Omitted accordingly, in the case of the use of the coating material combination of the invention for producing a coating, are the flashing or curing of the surfacer coat in the oven, the possible need for corrective sanding of the cured surfacer coat, the interim storage of a body or parts thereof, coated with a surfacer coat, in buffer zones, and the possible need for cleaning thereof prior to application of the coating material for forming the topcoat. As a result it is possible to reduce surface defects caused by improper application and/or by suboptimal matching of the coating materials such as, for example, the development of pops in solvent-based topcoats resulting from water from an inadequately flashed or dried aqueous surfacer coat. The coating material combination of the invention also minimizes the incidence of wetting defects (craters) on substrates with low surface energy. The coatings produced with the coating material combination of the invention exhibit a profile of properties which is at least comparable with that of coatings from the prior art.

The present invention is additionally elucidated hereinafter by the examples which follow.

Unless otherwise stated, amounts in parts are parts by weight, and amounts in percent are percentages by weight.

Unless indicated otherwise herein, all indications of standards refer to the standard current on the filing date of the present invention.

ABBREVIATIONS AND STARTING MATERIALS

TNP 1,1,1-tris(hydroxymethyl)propane
HHPAn hexahydrophthalic anhydride
Cardura E10® glycidyl ester of neodecanoic acids; manufacturer: Momentive
HDI hexamethylene diisocyanate
IPDI isophorone diisocyanate The nonvolatile fraction, i.e., the solids content (solids fraction), of the coating materials is determined according to DIN EN ISO 3251 (date: June 2008). The test duration for this is 60 minutes at a temperature of 130° C. The nonvolatile fraction which remains after drying is expressed in relation to the initial mass, and indicates the percentage solids content of the coating material composition.

Determination of the OH number: The OH number is calculated via the stoichiometry of the components used. The OH number is calculated from the OH-functional components employed minus the acid number attained, plus the further OH groups arising from the ring-opening reaction.

Determination of the acid number: The acid number is determined by titration with a KOH solution according to DIN EN ISO 2114. The acid number here indicates the amount of potassium hydroxide in mg which is consumed in the neutralization of 1 g of the respective compound.

The reported OH numbers and acid numbers relate in each case to the solids fraction of the coating material.

Determination of the molecular weight: Molecular weight determinations are carried out by means of gel permeation chromatography (GPC) at 40° C. using a high-pressure liquid chromatography pump and a refractive index detector. Eluent used is tetrahydrofuran, with an elution rate of 1 ml/min. Calibration is carried out using a polyMMA standard. The number-average molecular weight Mn, the weight-average molecular weight Mw, and Mp are determined, with the polymolecularity index Mp being calculated from Mp=Mw/Mn.

Determination of the glass transition temperature $T_g$ is carried out according to DIN 53765.

The measurement of the viscosity was carried out at 23° C. using a rotational viscometer from Brookfield, model cap 2000+, spindle 3 with a shear rate of 1250 s$^{-1}$.

In the working examples below, application took place in each case by ESTA to cathodically electrocoated substrate; dry film thicknesses: surfacer 30 µm in each case, topcoat 50 µm in each case.

Prior art: Comparative example sample 1 with a commercial surfacer (surfacer 1) and a commercial white two-component topcoat (topcoat 1) (both from BASF Coatings GmbH Münster):

Surfacer 1 is a solventborne one-component (1-K) surfacer based on a polyester, crosslinked with a melamine resin. An alternative possibility is to also use other commercial solventborne fillers, such as polyamine-crosslinked epoxy resins or oligoisocyanate-crosslinked OH-functional acrylate resins, for example, and also aqueous surfacers.

Topcoat 1 is a two-component (2-K) topcoat (white) based on an OH-functional acrylate resin which has been crosslinked with oligoisocyanate (similar in composition to the topcoat composition of topcoat 2).

Filler and topcoat of the inventive coating material combination: solventborne 2-K surfacer (surfacer 2) and solventborne 2-K topcoat (white) (topcoat 2)

Description of the Individual Syntheses for Producing the Inventive Coating Material Combination:

Polyester:

Analogous: reference: Research Disclosure (2006), 505 (May), P520-P521 (No. 505044) CODEN: RSDSBB; ISSN: 0374-4353

In analogy to example A from the literature reference identified above, 1 mol of TNP is reacted with 2 mol of HHPAn, and then the resulting product is reacted in a second stage with 2 mol of Cardura E-10® at 120° C. After a further 2 hours at this temperature, the product is cooled and diluted with a mixture of 2 parts xylene and 1 part SOLVENT-NAPHTHA 160/180 to a solids content of 84±1%. This gives a viscous solution having a viscosity of 3400-4800 mPas.

OH-Functional Acrylate 1:

OH-functional acrylate polymerized in SOLVENT-NAPHTHA 160/180 with an OH number of 115-125 mg KOH/g, a $T_g$ of 33° C., an acid number of 5-8 mg KOH/g, a number-average molecular weight of 1200-2000 daltons, and a weight-average molecular weight of 3300-5100 daltons (measured against polymethyl methacrylate as standard), and a solids content of 65±1%. The polymerization temperature is 160° C. under superatmospheric pressure (3 bar abs.).

The solvent is a mixture of SOLVENTNAPHTHA 160/180 and n-butyl acetate in a ratio of 4:1. The OH acrylate has a viscosity of 650-1000 mPas. The monomer composition is composed of approximately equal parts of styrene, hydroxyethyl methacrylate, methyl methacrylate, and isodecyl methacrylate.

OH-Functional Acrylate 2:

OH-functional acrylate polymerized in butyl acetate with an OH number of 152-160 mg KOH/g, a $T_g$ of 55° C., an acid number of 8-10 mg KOH/g, a number-average molecular weight of 1600-2200 daltons, and a weight-average molecular weight of 3900-4500 daltons (measured against polymethyl methacrylate as standard), and a solids content of 55±1%. The solvent is a mixture of SOLVENTNAPHTHA 160/180 and n-butyl acetate in a ratio of 7:1.

The OH acrylate has a viscosity of 900-1300 mPas. The monomer composition consists of equal parts of styrene, butyl methacrylate, hydroxyethyl methacrylate, hydroxypropyl methacrylate, and also cyclohexyl methacrylate and a small fraction of acrylic acid.

OH-Functional Acrylate 3:

OH-functional acrylate polymerized in butyl acetate with an OH number of 115-125 mg KOH/g, a $T_g$ of 33° C., an acid number of 5-8 mg KOH/g, a number-average molecular weight of 1300-1500 daltons, and a weight-average molecular weight of 3700-4500 daltons (measured against polymethyl methacrylate as standard), and a solids content of 78±1% in butyl acetate. The polymerization temperature is 160° C. under superatmospheric pressure (3 bar abs.).

This gives a viscous solution having a viscosity of 5800-6300 mPas. The monomer composition is composed of approximately equal parts of styrene, hydroxyethyl methacrylate, methyl methacrylate, and isodecyl methacrylate.

Working Example of a Surfacer Formulation and a Topcoat Formulation for the Inventive Coating Material Combination (Surfacer 2 with Topcoat 2)

|  | Surfacer 2 | Topcoat 2 |
|---|---|---|
| Polyester (solid) | 15.5 | 16 |
| OH acrylate resin 1 and 2 (solid) | 10 | 13.1 |
| OH acrylate resin 3 (solid) | 11 | 9.4 |
| Commercial dispersing additives (Disperbyk from Byk) | 1 | 0.8 |
| Filler 1 Talc | 5 | 0 |
| Filler 2 Chalk | 16 | 0 |
| Filler 3 Zinc oxide | 12 | 0 |
| Pigment 1 Titanium dioxide | 3 | 33.7 |
| Pigment 2 Carbon black | 0.01 | 0.2 |
| Additives (light stabilizer, UV absorber, HALS) | 0 | 0.5 |
| Thixotropic additive 1 Aerosil | 0.1 | 0.2 |
| Thixotropic additive 2 Bentone | 0.3 | 0.2 |
| Catalyst | 0.02 | 0.02 |
| Solvents Acetates, ketones, aromatics, aliphatics | 25 | 25.83 |
| Additives (flow control, wetting) | 0.07 | 0.05 |
|  | 100 | 100 |

Both surfacer and topcoat were crosslinked with a commercial aliphatic oligoisocyanate based on hexamethylene diisocyanate (HDI). Alternatively, crosslinking can also be carried out with isophorone diisocyanate (IPDI).

The application itself was made in each case under identical conditions, with ESTA (electrostatic application), from the same distance, with the same delivery rates, drawing speeds, rotary speed of the bell, etc.

Inventive samples: In inventive examples 2, 3 and 4, the coating material for forming the topcoat is applied before the coating material for forming the surfacer coat has reached drying stage 1 according to DIN 53150:2002-09. The samples differ in the flash-off time of the surfacer coat.

Comparative samples with surfacer 1 or surfacer 2: The topcoat was applied, after curing of the surfacer, to the respective cured surfacer coat.

Sample 1: Surfacer 1 cured thermally before topcoat application

Sample 5: Surfacer 2 cured thermally before topcoat application

| | Sample | | | | |
|---|---|---|---|---|---|
| | 1* | 2 | 3 | 4 | 5* |
| Surfacer | Surfacer 1 | Surfacer 2 | Surfacer 2 | Surfacer 2 | Surfacer 2 |
| Flash-off time of surfacer coat | | 240 sec | 480 sec | 600 sec | |

-continued

| | Sample | | | | |
|---|---|---|---|---|---|
| | 1* | 2 | 3 | 4 | 5* |
| Curing of surfacer coat | x | | | | x |
| Topcoat | Topcoat 1 | Topcoat 2 | Topcoat 2 | Topcoat 2 | Topcoat 2 |
| LW | 23.6 | 3.4 | 5.4 | 7.2 | 17.5 |
| SW | 6.2 | 5.4 | 6.5 | 6.9 | 2.3 |
| N1 | 8.4 | 3.6 | 4.8 | 5.5 | 8 |
| N3 | 8.4 | 3.8 | 5.1 | 5.8 | 8.3 |
| CF | 43.3 | 70.2 | 64.4 | 60.6 | 44.6 |
| DOI | 92.4 | 93.3 | 93.2 | 93 | 93.6 |

*not inventive

With noninventive combination of surfacer 1 with topcoat 1 or 2 (not listed in the table) and with application of the topcoats to the surfacer coat before the latter has achieved dust dryness, after the flash-off times reported in the table, matt topcoat surfaces were obtained. This represents an unwanted side effect. The surface properties of a matt surface cannot be measured using a wave-scan instrument.

The optical properties were measured using a commercial wave-scan dual instrument from Byk Gardner. The values obtained therewith on glossy surfaces were converted, by the accompanying software, into the following values:

Longwave (LW), shortwave (SW)

N1 and N3 (according to BMW scales, which represent the surface as viewed from a distance of 1 m and 3 m respectively)

CP (according to FORD scales, which are made up of luster, sharpness, and orange peel)

DOI (corresponding approximately to the gloss at a 20° viewing angle)

With regard to the evaluation of the optical result, better optical properties are present when LW and SW are smaller and/or when LW<SW N1 and N3 are smaller CF is greater The results table shows that sample 2 (inventive coating material combination of surfacer 2 and topcoat 2 with the shortest flash-off time) exhibits the best optical properties. An extension to the flash-off time causes deterioration in the optical properties, contrary to the existing experience with known coating material combinations from the prior art. Overall it is found that all inventive samples exhibit good optical properties. In particular, the coatings produced from the coating material combinations of the invention display the best results in terms of gloss and leveling.

What is claimed is:

1. A cured coating material combination on a substrate, consisting of:

a first coating material comprising at least one coloring pigment and at least one externally crosslinking binder as main binder, wherein the first coating material is cured to form a surfacer coat on the substrate;

a second coating material comprising at least one coloring pigment and at least one externally crosslinking binder as main binder, wherein the second coating material is cured to form a topcoat on the surfacer coat, wherein:

the first and second coating materials are different from one another;

the first and second coating materials are compatible according to DIN EN ISO 12944-5:2008-1;

the second coating material is applied to the surfacer coat before the surfacer coat has reached drying stage 1 according to DIN 53150:2002-09, the drying stage being determined according to EN ISO 9117-3:2010;

the first coating material comprises organic solvents;

the second coating material comprises organic solvents;

the organic solvents of the first coating material and the organic solvents of the second coating material substantially belong to the same solvent class;

the flash-off time between application of the first coating material and application of the second coating material is 480 seconds or less; and the cured coating material combination consisting of the surfacer coat formed on the substrate and the topcoat formed on the surfacer coat has an LW value being less than an SW value and/or has an LW value being less than the LW value of a cured coating material combination consisting of a surfacer coat i-a) and a topcoat i-b) applied thereon, which has been obtained from the same first and second coating materials, but wherein the flash-off time between application of the first coating material i-a) and application of the second coating material i-b) exceeds 480 seconds.

2. The cured coating material combination as claimed in claim 1, wherein the main binder of the first coating material and the main binder of the second coating material are compatible according to DIN EN ISO 12944-5:2008-01.

3. The cured coating material combination as claimed in claim 1, wherein the main binder of the first coating material and the main binder of the second coating material belong to the same binder class.

4. The cured coating material combination as claimed in claim 1, wherein the main binder of the first coating material and the main binder of the second coating material are identical.

5. The cured coating material combination as claimed in claim 1, wherein the organic solvents of the first coating material and the organic solvents of the second coating material are identical.

6. The cured coating material combination as claimed in claim 1, wherein the main binder and the organic solvents of the first coating material and the main binder and the organic solvents of the second coating material are identical.

7. The cured coating material combination as claimed in claim 1, wherein the first and second coating materials have a solids fraction of at least 40 wt %.

8. The cured coating material combination as claimed in claim 1, wherein:

the main binder of the first coating material is selected from the group consisting of isocyanate-crosslinking, polyhydroxyl group-containing polyester and polyacrylate resins and mixtures thereof; and the main binder of the second coating material is selected from the group consisting of isocyanate-crosslinking, polyhydroxyl group-containing polyester and polyacrylate resins and mixtures thereof.

9. A process for producing the cured coating material combination of claim 1 on a substrate, the process comprising applying the first and second coating materials combination as defined in claim 1 to a substrate, wherein:

i-a) the first coating material is applied to the substrate to form a surfacer coat; and i-b) the second coating material is applied to the surfacer coat to form a topcoat, the application of the second coating material in i-b) taking place before the coating material for forming the surfacer coat in i-a) has reached drying stage 1 according to DIN 53150:2002-09, the drying stage being determined according to EN ISO 9117-3:2010; and curing the first and second coating materials to obtain the cured coating material combination consisting of a cured surfacer coat and cured topcoat.

10. The cured coating material combination as claimed in claim 1, wherein the first and second coating materials have solid fraction of at least 65 wt-%.

11. A cured coating material combination on a substrate, consisting of:

a first coating material comprising at least one coloring pigment, a crosslinker component and a component to be crosslinked, wherein the first coating material is cured to form a surfacer coat on the substrate;

a second coating material comprising at least one coloring pigment, a crosslinker component and a component to be crosslinked, wherein the second coating material is cured to form a topcoat on the surfacer coat, wherein:

the first and second coating materials are different from one another;

the first coating material and the second coating material are compatible according to DIN EN ISO 12944-5: 2008-1;

the second coating material is applied to the surfacer coat before the surfacer coat has reached drying stage 1 according to DIN 53150:2002-09, the drying stage being determined according to EN ISO 9117-3:2010;

the first coating material comprises organic solvents;

the second coating material comprises organic solvents;

the organic solvents of the first coating material and the organic solvents of the second coating material substantially belong to the same solvent class; and wherein the flash-off time between application of the first coating material and application of the second coating material is 480 seconds or less.

12. The cured coating material combination as claimed in claim 11, wherein the crosslinker component in the first and second coating materials comprises reactive NCO groups and the component to be crosslinked in the first and second coating materials comprises reactive OH-groups.

13. The process according to claim 9, wherein the flash-off time between application of the first coating material i-a) and application of the second coating material i-b) is 480 seconds or less.

14. A cured coating material combination on a substrate, consisting of:

a first coating material comprising at least one coloring pigment and at least one externally crosslinking binder as main binder, the main binder of the first coating material is selected from the group consisting of isocyanate-crosslinking, polyhydroxyl group-containing polyester and polyacrylate resins and mixtures thereof, wherein the first coating material is cured to form a surfacer coat on the substrate;

a second coating material comprising at least one coloring pigment and at least one externally crosslinking binder as main binder, the main binder of the second coating material for forming the topcoat is selected from the group consisting of isocyanate-crosslinking, polyhydroxyl group-containing polyester and polyacrylate resins and mixtures thereof, wherein the second coating material is cured to form a topcoat on the surfacer coat;

wherein:

the crosslinker component in the first and second coating materials comprises reactive NCO groups and the component to be crosslinked in the first and second coating materials comprises reactive OH-groups;

the first and second coating materials are different from one another;

the first coating material and the second coating material are compatible according to DIN EN ISO 12944-5: 2008-1;

the first coating material is applied to the surfacer coat before the surfacer coat has reached drying stage 1 according to DIN 53150:2002-09, the drying stage being determined according to EN ISO 9117-3:2010;

the first coating material comprises organic solvents;

the flash-off time between application of the first coating material and application of the second coating material is 480 seconds or less;

the second coating material comprises organic solvents; and the organic solvents of the first coating material and the organic solvents of the second coating material substantially belong to the same solvent class.

15. The coating material combination of claim 14, wherein the cured coating material combination consisting of the surfacer coat formed on the substrate and the topcoat formed on the surfacer coat has an LW value being less than an SW value and/or has an LW value being less than the LW value of a cured coating material combination consisting of a surfacer coat i-a) and a topcoat i-b) applied thereon, which has been obtained from the same first and second coating materials, but wherein the flash-off time between application of the first coating material i-a) and application of the second coating material i-b) exceeds 480 seconds.

16. The coating material combination as claimed in claim 1, wherein the organic solvents of the first coating material and the organic solvents of the second coating material are both selected from the group consisting of aromatic hydrocarbons, aliphatic hydrocarbons, heterocyclic hydrocarbons, esters, ketones, ethers, amides and mixtures thereof.

17. The coating material combination as claimed in claim 1, wherein the organic solvents of the first coating material and the organic solvents of the second coating material are substantially free from mono- or polyhydric alcohols.

18. The cured coating material combination as claimed in claim 1, wherein the substrate comprises a body or a cabin of a motor vehicle, or a constituent thereof.

19. The cured coating material combination as claimed in claim 11, where the substrate comprises a body or a cabin of a motor vehicle, or a constituent thereof.

20. The cured coating material combination as claimed in claim 14, where the substrate comprises a body or a cabin of a motor vehicle, or a constituent thereof.

21. The cured coating material combination as claimed in claim 10, wherein the surfacer coat has a dry film thickness of 25 μm to 35 μm and the topcoat has a dry film thickness of 40 μm to 80 μm.

22. The cured coating material combination as claimed in claim 1, wherein the main binder of the first coating material and the main binder of the second coating material each comprise a crosslinker component selected from hexamethylene diisocyanate and isophorone diisocyanate.

23. The cured coating material combination as claimed in claim 1, wherein the main binder of the first coating material and the main binder of the second coating material each comprise a mixture of isocyanate-crosslinking, polyhydroxyl group-containing polyester and polyacrylate resins, wherein the polyacrylate resin comprises at least two polyacrylate resins, and wherein the main binder of the first coating material and the main binder of the second coating material are identical.

24. The cured coating material combination as claimed in claim 23, wherein the polyacrylate resin comprises a first polyacrylate resin, a second polyacrylate resin, and a third polyacrylate resin, and wherein:

the first polyacrylate resin is polymerized in a solvent mixture of solvent naphtha and n-butyl acetate, and the first polyacrylate resin comprises a monomer composition consisting of styrene, hydroxyethyl methacrylate, methyl methacrylate, and isodecyl methacrylate;

the second polyacrylate resin is polymerized in butyl acetate, and the second polyacrylate resin comprises a monomer composition consisting of styrene, butyl methacrylate, hydroxyethyl methacrylate, and hydroxypropyl methacrylate, cyclohexyl methacrylate, and acrylic acid; and the third polyacrylate resin is polymerized in butyl acetate, and the third polyacrylate resin comprises a monomer composition consisting of styrene, hydroxyethyl methacrylate, methyl methacrylate, and isodecyl methacrylate.

* * * * *